US 6,621,618 B1

(12) United States Patent
Kaaden et al.

(10) Patent No.: US 6,621,618 B1
(45) Date of Patent: Sep. 16, 2003

(54) OPTICAL SCANNING DEVICE

(75) Inventors: Jürgen Kaaden, Villingen-Schwenningen (DE); Klaus Oldermann, Villingen-Schwenningen (DE); Tsuneo Suzuki, Mönchweiler (DE)

(73) Assignee: Thomson Licensing S. A., Boulogne (FR)

( * ) Notice: Subject to any disclaimer, the term of this patent is extended or adjusted under 35 U.S.C. 154(b) by 0 days.

(21) Appl. No.: 10/111,487

(22) PCT Filed: Oct. 16, 2000

(86) PCT No.: PCT/EP00/10147
§ 371 (c)(1),
(2), (4) Date: Apr. 25, 2002

(87) PCT Pub. No.: WO01/31646
PCT Pub. Date: May 3, 2001

(30) Foreign Application Priority Data

Oct. 27, 1999 (DE) .......................... 199 51 862

(51) Int. Cl.[7] .............................. G02F 1/29; G02B 7/02; G11B 7/00
(52) U.S. Cl. .................... 359/298; 359/814; 359/813; 359/822; 369/44.15; 369/44.22
(58) Field of Search ................... 359/298, 315, 359/811, 819, 822, 823, 824, 814, 813; 369/44.15, 44.16, 44.21, 44.22

(56) References Cited

U.S. PATENT DOCUMENTS 4,991,161 A    2/1991  Ikegame et al. ......... 369/44.15
5,007,712 A    4/1991  Kikuchi et al. ............. 350/255
5,724,197 A *  3/1998  Barnes et al. ................ 359/824
5,742,440 A    4/1998  Marino ....................... 359/814
5,886,978 A    3/1999  Matsui ........................ 369/244
6,160,771 A * 12/2000  Kawano et al.

FOREIGN PATENT DOCUMENTS

EP      510652    10/1992   ............. G11B/7/09
EP      700036     3/1996   ............. G11B/7/09
EP      764945     3/1997   ............. G11B/7/09

* cited by examiner

Primary Examiner—Georgia Epps
Assistant Examiner—Tim Thompson
(74) Attorney, Agent, or Firm—Joseph S. Tripoli; Harvey D. Fried; Francis A. Davenport

(57) ABSTRACT

The invention relates to an optical scanning device for apparatuses for recording and/or reproducing information on optical recording media, which is suitable in particular for recording and/or reproducing information at high speed, such as, for example, the scanning of a DVD at a twelve-fold speed. According to the invention, the optical scanning device has a lens holder which is formed as a hollow body and whose side walls are arranged such that they run at an angle to a connecting point with its elastic support. The thus hexagonally formed lens holder has advantageous air chambers and an enlarged distance from the lens, and also an elastic support deviating from a parallel guide, which lead to a low degree of lens tilting, improved guidance properties and a natural resonance behaviour which is necessary for scanning at high speed. The field of application relates to the production of scanning devices for optical recording media which are provided for recording and/or reproducing information at high speed.

5 Claims, 11 Drawing Sheets

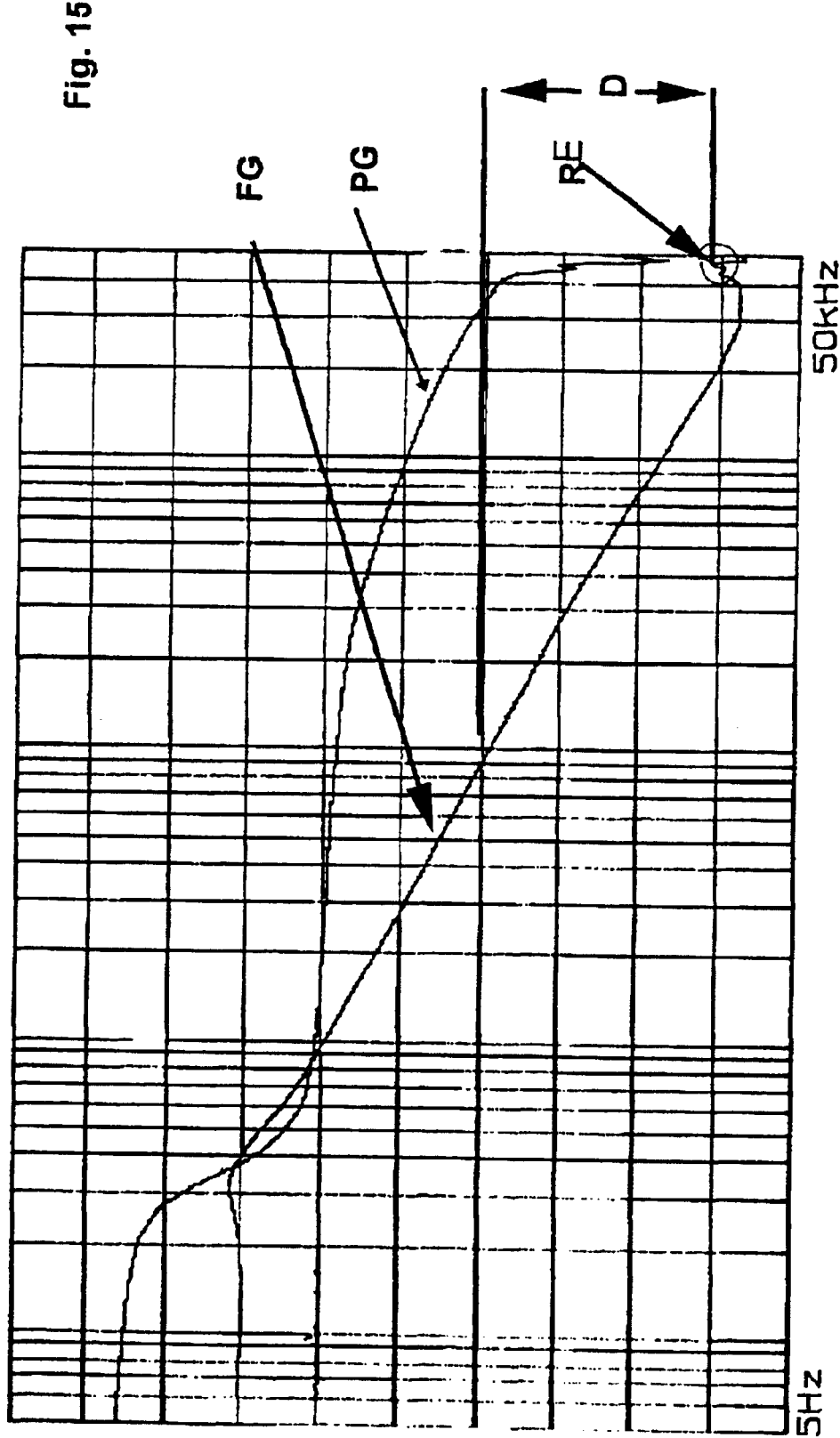

OPTICAL SCANNING DEVICE

This application claims the benefit, under 35 U.S.C. §365 of International Application PCT/EP00/10147, filed Oct. 16, 2000, which was published in accordance with PCT Article 21(2) on May 3, 2001 in English and which claims the benefit of German patent application No. 19951862.9 filed Oct. 27, 1999.

BACKGROUND OF THE INVENTION

The invention relates to an optical scanning device for apparatuses for recording and/or reproducing information on optical recording media, which is suitable in particular for recording and/or reproducing information at high speed, such as, for example, the scanning of a DVD at a twelve-fold speed.

Optical scanning devices for recording media in laser disc and compact disc players are generally known. The design and function of such scanning devices, also referred to as pick-up, are described in Electronic Components & Applications, Vol. 6, No. 4, 1984, pages 209–215. Such scanning devices have a so-called actuator on which there is arranged an objective lens which is provided for tracking and for focusing the light beam or laser beam on the optical recording medium. In principle, optical scanning devices can be distinguished by the way in which the objective lens is suspended. Thus, the objective lens mount is fastened to a frame for example by means of four parallel leaf springs in the case of a known leaf-spring actuator or via articulated joints or hinges in the case of an actuator of the articulated-joint or hinge type, respectively. Disadvantages are that such arrangements have an undesirable tendency to oscillate, require a high level of assembly complexity and have relatively high reaction times inter alia due to the mass to be moved. A further way of elastically supporting the objective lens mount is to use four wires which connect the lens holder to the actuator baseplate. In comparison with optical scanning devices with a leaf spring or articulated joint, so-called wire pick-ups can be produced more cost-effectively and allow shorter access times. However, they are particularly sensitive relative to other parallel guides with regard to resonance phenomena, tilting of the objective lens and thermal loads. On the other hand, in particular for high-speed applications and in order to achieve short access times, high currents are necessary in the track and focus coils, which currents heat the lens holder and lead to undesirable oscillation of the lens holder and to tilting of the objective lens. The scanning of optical recording media at a multiple of the speed which is necessary for reading or recording on an audio, video or data CD or DVD at single speed increases the requirements made of optical scanning devices with regard to uniformity of the response characteristic. The frequency response and phase angle of the optical scanning device should have as uniform a profile as possible over a wide frequency range and not be disturbed by free oscillations. It is demanded, for example, that resonance phenomena occur only above 40 kilohertz and they have a level reduction or attenuation of 45 decibels in comparison with attenuation at a frequency of 1 kilohertz, in order to be able to scan a DVD at a twelve-fold speed.

SUMMARY OF THE INVENTION

The object of the invention is to provide an optical scanning device for optical recording media which to the greatest possible extent avoids the disadvantages of known optical scanning devices with regard to oscillation properties, speed and thermal load ability, meets the requirements in the course of reading or recording at high speed and can be produced with a low degree of complexity.

This object is achieved by means of features which are specified in the main claims. Advantageous designs and developments are specified in subclaims.

One aspect of the invention involves avoiding to the greatest possible extent the disadvantages of so-called wire pick-ups relative to other parallel guides with regard to tilting of the objective lens, asymmetrical guidance properties, natural resonance behaviour and thermal load ability for high-speed applications, and nevertheless producing the optical scanning device with a low degree of complexity.

To that end, an optical scanning device for high-speed applications is provided which has a lens holder which is formed by a hollow body and whose side walls are arranged such that they run at an angle to a connecting point with its elastic support. The lens holder has a hexagonal form which is formed with the side walls which run at an angle to a connecting point with its elastic support. As a result of the hexagonal shape of the lens holder, air chambers are formed between lens and coils of the actuator, the distance between lens and coils of the actuator is enlarged and the stability or rigidity of the lens holder formed by a hollow body is increased. For this purpose, the side walls or side areas of the lens holder are preferably arranged such that they deviate at an angle of from 3 to 10 degrees from a straight line. The angle at which the side walls of the lens holder are arranged with respect to one another is chosen in such a way that, in the event of maximum deflection of the lens holder from its neutral position, contact occurs neither before nor after the connecting point with the wires which support it.

The lens holder formed by a hollow body is of integral design and preferably constructed symmetrically. The configuration as hollow body with air chambers further improves the thermal properties of the optical scanning device since additional cooling and heat dissipation are achieved by actuator movements. Moreover, the heat dissipation can be increased further by giving the surface of the lens holder a dark configuration. Furthermore, the wires which elastically support the lens holder are arranged at an angle which, in the neutral position of the lens holder, deviates by more than two degrees from a perpendicular to the lens holder, in order to ensure little or no tilting of the lens over the entire deflection range of the actuator for tracking. With the angle, a change is made to the rigidity of the support of the actuator on its baseplate and, as a result, also to the resonance behaviour in a targeted manner for a direction of action. By virtue of the angle at which the wires which elastically support the lens holder for tracking are brought up to the lens holder, there is an advantageous influence both on the guidance properties in the event of deflection of the lens for the purpose of following the recording track, on account of the lens tilting to a lesser extent, and on the natural resonance behaviour of the optical scanning device. Since the ends of the wires, which ends project freely beyond the connecting point with the lens holder, may, as a result of the mounting process or during separation, deviate from the original direction in which they were brought up to the lens holder, the side walls of the lens holder are arranged at an angle which is preferably greater than or equal to the angle at which the wires are brought up to the lens -holder in its neutral position. The wires which elastically support the lens holder for tracking on the baseplate are brought up to the lens holder in punctiform fashion. This enlarges the lateral distance between wire and lens holder in the vicinity of the soldering or connection point, with the result that, on the one hand, the process of bringing up the wires is facilitated and, on the other hand, an adverse effect on the guidance properties which is based on burr on the parts or on residues of soldering agent is avoided. Furthermore, it may be assumed that reduced resonance phenomena deep into the kilohertz range can also be attributed to the fact that oscillations proceeding from the lens holder are prevented from propagating by the angle between wire and side wall of the lens holder.

The side walls which are arranged at an angle to one another have the effect of achieving, despite a compact structure of the lens holder, a larger distance between the lens and the windings, which are heated by high currents in high-speed applications.

A depression for accommodating the focus coil is provided in the side walls of the lens holder, the said depression forming webs on which there is fixed, after the application of the focus coil, a circuit board, preferably formed by a printed circuit board. The circuit board advantageously connects to one another the webs which are provided on the upper and lower edges of the lens holder, and thereby contributes to the stability of the lens holder. Such a circuit board is arranged on each side of the lens holder and soldering points are provided on the circuit board, not only ends of the coils but also the wires which are provided for elastic support of the lens holder being fixed to the said soldering points. The circuit boards are arranged on the side areas, which run at an angle to one another, in such a way that an edge of the circuit board coincides approximately with the line formed by side areas which meet one another at an angle. The fixing points provided for the connection of the wires which elastically support the lens holder are also arranged in this region, thereby ensuring a punctiform connection of these wires. In order to align the circuit board on the lens holder, pins are provided on the webs of the lens holder and engage in the recesses in the circuit board, and either a latching connection or an adhesive bond is provided in order to connect a circuit board and lens holder. Further advantages of the circuit boards connecting the webs of the lens holder are that they have a low weight and can be of symmetrical design. Furthermore, pins are also available in the case of a symmetrically constructed lens holder. The said pins can be used for attaching winding ends. The focus coil is preferably arranged symmetrically with respect to the horizontal centre of mass of the lens holder and the lens holder webs bounding the winding space of the focus coil preferably have shoulders at the ends of the inner faces of the webs. The effect achieved by the shoulders which are provided in one embodiment of the lens holder is that the turns of the focus coil are wound adjacently without overlapping during the winding operation. This is particularly important for the attachment of the first winding, since turns otherwise cross one another in an undesirable manner. In accordance with a first design, the lens holder is produced using plastic injection-moulding technology and additional ventilation openings are provided in the region surrounding the lens, which openings reduce the air resistance of the actuator and intensify cooling during its movement. The assembly comprising lens holder, focus and tracking coils and the abovementioned circuit board and lens is designated as actuator. However, in the process for producing the optical scanning device, the lens is generally inserted into the lens holder only after the lens holder has been mounted on an actuator baseplate. The mounting process for the lens is simplified by guide webs provided on the lens holder. Air chambers formed by the hexagonal form of the lens holder separate the lens from the winding chamber by a cavity which reduces the thermal load on the lens on account of high coil currents in high-speed applications. The hexagonal form of the thin-walled lens holder increases the rigidity of the lens holder by comparison with a rectangular form and the winding of the focus coil is improved by the wire tension that occurs, since the coil wire bears better on the side walls on the hexagonal lens holder in comparison with a rectangular lens holder. The hexagonal form of the lens holder and a coil which does not project beyond the lens holder reduce the air resistance during lateral movement.

Peripherally arranged webs of the lens holder which is produced from plastic are advantageously used for aligning the tracking coils, which makes it possible to dispense with a complicated positioning device. The tracking coils partially widen the webs and stiffen them. The natural resonance behaviour is thereby improved further. In order to improve the heat dissipation, the lens holder is coloured or coated such that it is dark, preferably black, as a result of which higher coil currents can be permitted and the actuator can be operated at high frequencies with a large power, which is of particular importance for example for focusing the light beam or laser beam on the information medium for recording or reproducing information. In accordance with a further design, the pins which are not required for positioning the circuit boards in the case of a symmetrical lens holder are used for the purpose of having winding wire wrapped around them or for the purpose of fixing coil wire ends. In accordance with a further design, the lens holder is provided with an increased wall thickness in the connection region of the wires which form the elastic support for the lens holder, the said increased wall thickness absorbing forces proceeding from the circuit boards, without deforming the lens holder. The rigidity and the natural resonant frequency of the lens holder are thereby increased further. Furthermore, in order to increase the strength of the side walls, a rib running at an inclination may be arranged between the ventilation openings surrounding the lens. In accordance with a further design, a focus coil is used which is formed by copper-sheathed aluminium wire. Aluminium-core wire is lighter than comparable solid-copper wire, so that forces generated in the focus direction are increased by a higher number of turns given the same weight. The same applies to the tracking coils. For tracking, coils which are wound in a D-shaped manner are preferably used. The outer part of the coil not contributing to force generation is reduced in length and the efficiency is thus improved. The leakage fields which are generated by the outer part of the coil in a rectangular coil and counteract the force generated in the inner region and thus lead to losses are reduced. The side walls of the lens holder are connected via transverse walls which preferably have a cutout in order to prevent rotation of the lens holder in the mounting device. The transverse walls contribute to stiffening the lens holder and a reduction in the weight of the lens holder is achieved by cutouts in the said walls.

The depth of the cutouts is chosen in such a way that the centre of gravity of the lens holder lies exactly between the wires which elastically support the lens holder. The abovementioned design measures can be used individually or in combination for the production of an optical scanning device for high-speed applications. In a further embodiment of the optical scanning device for high-speed applications, the lens holder is designed as a cast metal part. Metal materials and plastics materials have fundamentally different properties with regard to thermal conductivity and mechanical stability, which have to be taken into account in the configuration of an optical scanning device for high-speed applications. The metallic lens holder, for which the metal material used is preferably magnesium, is likewise preferably coloured black, or at least has a dark surface, for the purpose of heat dissipation to the surroundings. Since webs are difficult to realise in metal casting technology, in this design webs have been dispensed with to the greatest possible extent and, moreover, no ventilation holes are provided in addition to the air chambers. Nevertheless, the natural resonance behaviour is sufficient on account of the high material rigidity of the metal material and sufficient heat dissipation is also provided on account of the thermal conductivity of the metal material, the said heat dissipation being achieved in particular by virtue of the configuration of the lens holder as hollow body with air chambers. As a result of the webs being dispensed with, the hexagonal form of the lens holder corresponds to an H with limbs arranged such that they run towards one another at an angle. Since there are no webs in the region of the openings of the H-form, the tracking coils are positioned in the known manner in this design. In terms of its fundamental structure, however, the lens holder is designed in a manner corresponding to the first design. The wires which elastically support the lens holder in particular for tracking on the baseplate are brought up to the lens holder such that they run at an angle to one another and the lens holder is configured in such a way that it has side walls which are provided such that they run at an angle proceeding from the connecting point of the lens holder with the wires. The lens holder which is produced as a cast metal part likewise has a depression for accommodating the focus coil in the side walls. Irrespective of the design as a metallic lens holder or a lens holder produced from plastics material, the lens holder is preferably constructed symmetrically and the connecting point of the lens holder with the wires is preferably provided at the centre of gravity or at least in the region of the centre of gravity. The wires of the wire pick-up which form an elastic support for the lens holder are preferably pretensioned during connection to the lens holder by copper-bit soldering, in order to achieve less tilting and better guidance properties. However, it is possible to omit the pretensioning of the wires if connecting methods that result in a lower level of loading are chosen for fixing the wires. Examples of such connecting methods are laser soldering or the use of conductive adhesives.

The circuit board which connects the webs of the lens holder on the side walls and is used for the connection of the wires which elastically support the lens holder preferably has further depressions or openings in which winding wires are guided to the soldering or connection points provided on the circuit board. As a result, the attachment of the winding wires to the circuit board is simplified and the winding wires are held in a defined position relative to the soldering point prior to soldering, thereby simplifying the soldering process.

By virtue of the compact structure of the lens holder, which is achieved by a hollow body which has air chambers and whose side walls are arranged such that they run at an angle to the connecting point with its elastic support, and with an elastic support which is brought up to the lens holder or actuator at an angle which deviates from 90 degrees, an optical scanning device has been created which has an undisturbed frequency response and a corresponding phase characteristic over a large frequency range extending deep into the kilohertz range, which constitute a prerequisite for the possibility of using the optical scanning device for recording or for reproducing information at high speed. Furthermore, the particular configuration of the optical scanning device has achieved an increased attenuation or a larger response margin of the resonance value relative to a value occurring at a frequency of 1 kilohertz.

BRIEF DESCRIPTION OF THE DRAWINGS

The invention is explained in more detail below with reference to drawings using exemplary embodiments. In the figures:

FIG. 10 shows a schematic sketch of a plan view of the actuator of an optical scanning device—according to the invention—for optical recording media, FIG. 15 shows frequency and phase diagram of the optical scanning device.

Reference symbols are used in a corresponding fashion the figures.

DETAILED DESCRIPTION OF THE PREFERRED EMBODIMENT

Figure 1:
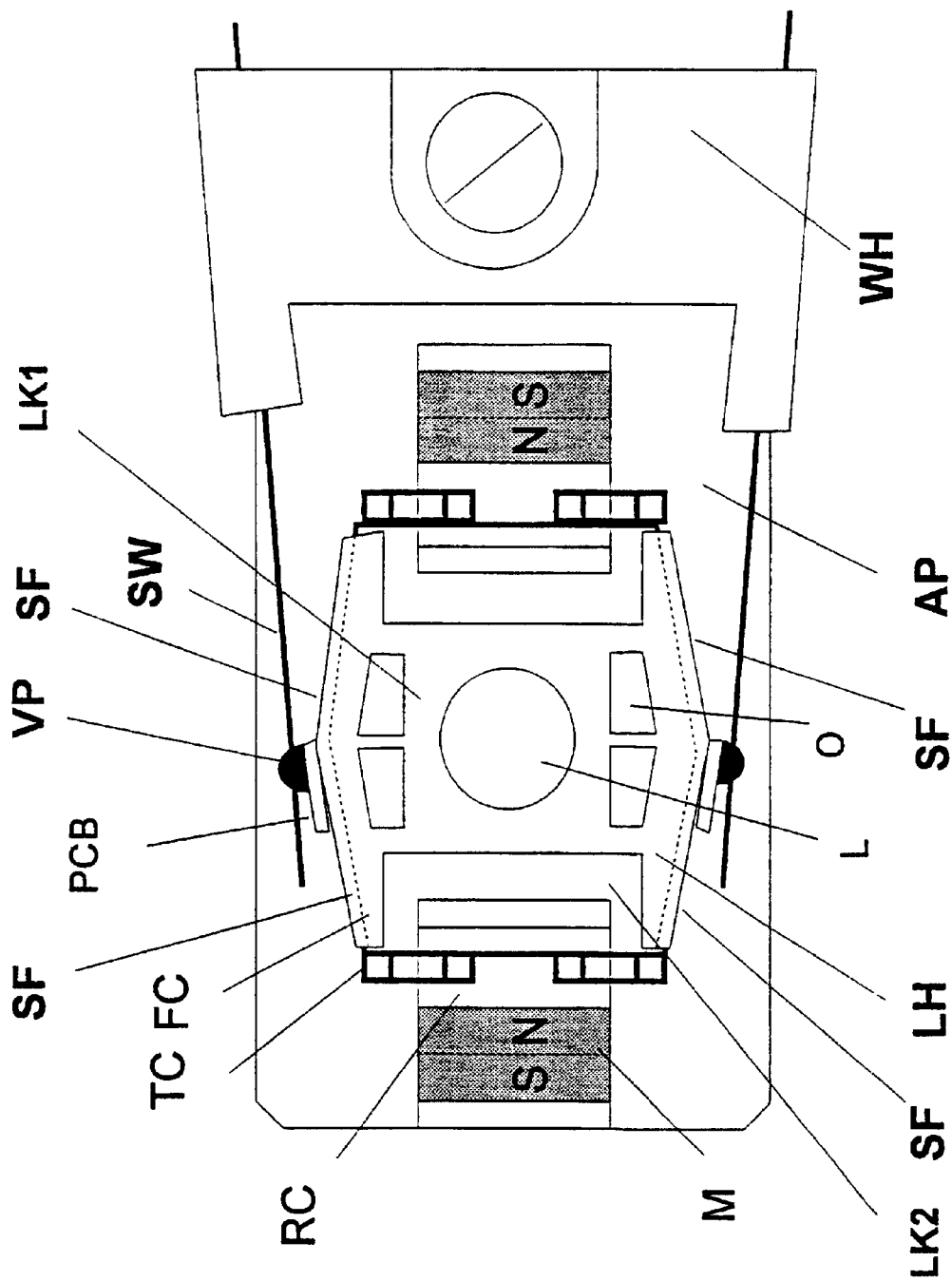
FIG. 1 shows a schematic sketch of a plan view of an optical scanning device for optical recording media.
Figure 2:
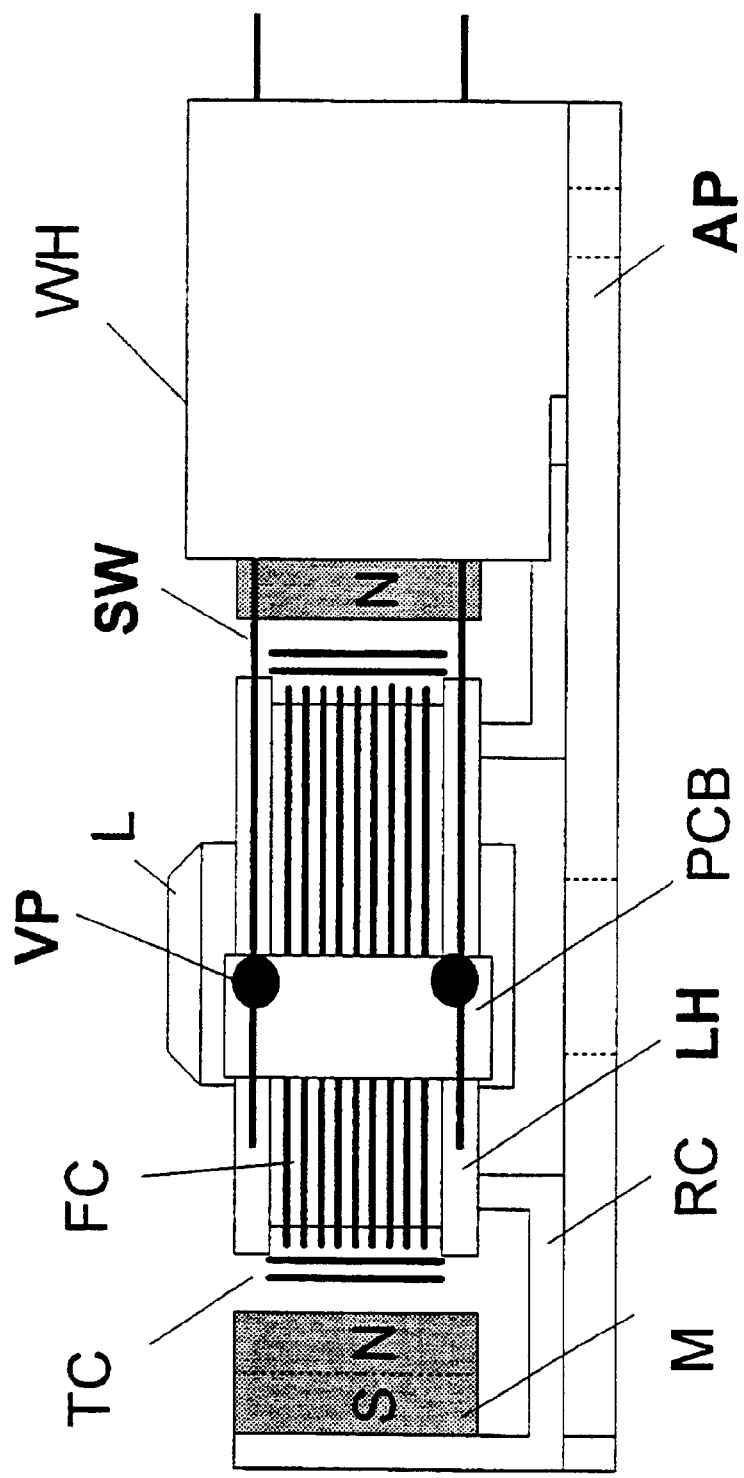
FIG. 2 shows a schematic sketch of a side view of the optical scanning device for optical recording media.
Figure 7:
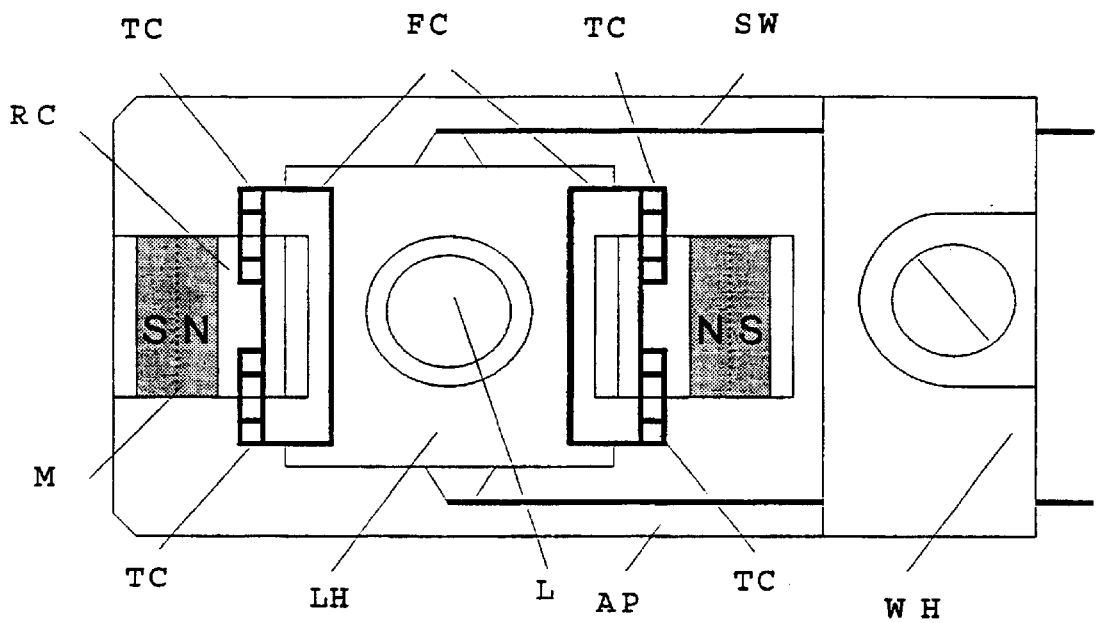
FIG. 7 shows a schematic sketch of a plan view of a known optical scanning device for optical recording media.
Figure 8:
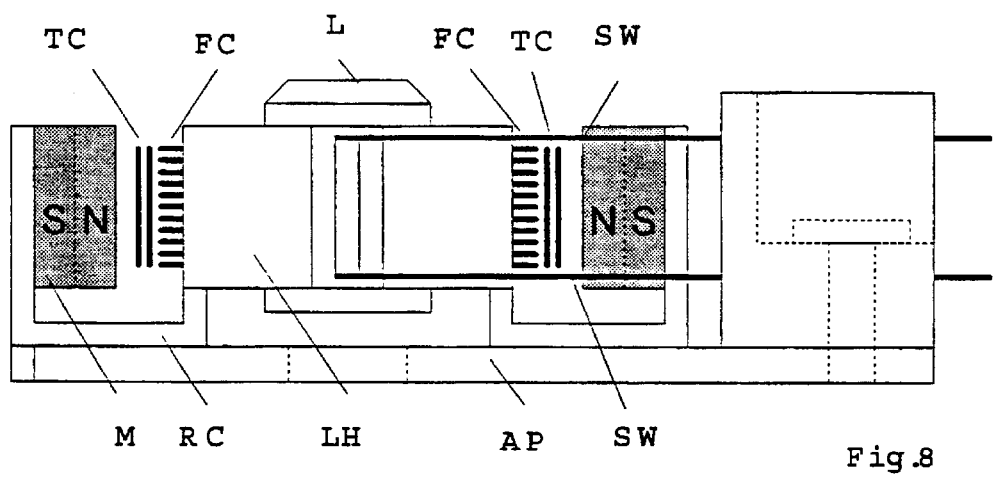
FIG. 8 shows a schematic sketch of a side view of the known optical scanning device for optical recording media.
Figure 9:
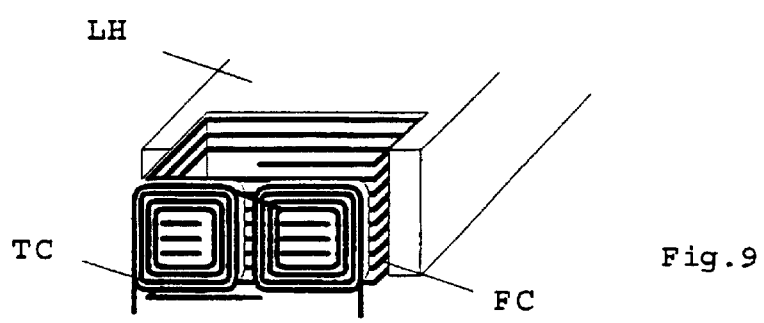
FIG. 9 shows a schematic sketch of a known arrangement of the focus and tracking coils on the lens holder of the known optical scanning device.

FIG. 1 illustrates the schematic sketch of the plan view, and FIG. 2 the schematic sketch of the side view, of an optical scanning device according to the invention for recording and/or reproducing information at high speed. The optical scanning device comprises an actuator baseplate AP and an actuator which is formed by a lens holder LH with a focus coil FC and tracking coils TC and has a lens L. The lens holder LH is connected by means of elastic wires SW to a wire holder WH fixed on the actuator baseplate AP. The wires SW support the lens holder LH elastically on the actuator baseplate AP and thereby enable deflection of the lens L from a neutral position both in the focus direction and in the track direction for scanning optical recording media. The wires SW are generally composed of copper wire and are connected to the lens holder LH and the wire holder WH by a soldered connection. The wires SW are generally used likewise to supply power to the coils for focusing and tracking which are arranged on the lens holder LH. In order to connect the wire SW to wire holder WH and lens holder LH, it is also possible to use other known connecting methods, such as welding, adhesive bonding or clamping, for example. After the wire SW has been connected to wire holder WH and lens holder LH, the wire SW is severed between the tensioning points and the operation is repeated or carried out in parallel with regard to further wires. In this respect, the scanning device according to the invention differs only insignificantly from the known production methods. Nevertheless, the properties of optical scanning devices are crucially influenced even by slight alterations in the structure or in the production process of the optical scanning device. In order to give an idea of the accuracy with which the light beam of an optical scanning device has to be guided on the information track of a recording medium, such as a CD for example, the following size comparison may be used. The information track on a CD has a width which is scarcely larger than one hundredth of the width of a human hair. If the diameter of a CD is compared with a football pitch, then to a rough approximation the track width corresponds to the diameter of a human hair. In the case of a DVD, track spacing and track width are reduced by a further order of magnitude. This makes it clear that even extremely slight alterations in the structure and configuration of the optical scanning device have a major influence on the quality and function of the optical scanning device. Furthermore, this is true all the more if the intention is to write to or read from recording media at high speed in order to attain high data rates. For high-speed applications or for fast control of the actuator, high currents are required in the tracking coils TC and in the focus coil FC, which currents heat the lens holder LH. This heating is also transferred to the lens L and, on account of the thermal properties of the lens L, severe optical deviations or disturbances occur at temperatures of above 60 degrees. Without special precautions the lens holder LH begins to oscillate at specific frequencies within the operating frequency range and, in the absence of countermeasures, the lens L has a tendency to tilt in the tracking region. Even slight tilting of the lens L, asymmetrical guidance properties and alterations of the optical properties of the lens L have a disadvantageous effect on recording or reproduction. Scanning devices for optical recording media which, as illustrated in FIGS. 7 and 8, use wires SW for the elastic support of the lens holder LH are generally known. Such scanning devices for optical recording media are also referred to as so-called wire pick-ups. They can be produced cost-effectively since they require a low degree of complexity in production. What is disadvantageous, however, is that, in comparison with other parallel guides, the wire pick-up exhibits relatively great tilting of the lens L and disadvantageous guidance properties. The disadvantageous guidance properties consist, in particular, in the fact that, in order to deflect the lens holder LH or actuator from its rest or neutral position, different forces are necessary and temperature changes alter the optical properties of the lens L. Just by pretensioning the wires SW of the wire pick-up which form an elastic support for the lens holder LH, it was possible to achieve a reduction in the tilting of the lens L and better guidance properties. The effect achieved by pretensioning the wires SW is that forces emanating from the connecting process do not exceed a pretension exerted on the wire SW. Nevertheless, the desired properties in the high-speed range still could not be achieved with a scanning device of this type. In a known scanning device for optical recording media, the wires SW which elastically support the lens holder LH are brought up to the lens holder LH in a parallel fashion and the lens holder LH has straight, parallel side walls SF with elevations via which the lens holder LH is connected to the wires SW, in a manner corresponding to FIGS. 7 and 8. The lens holder LH is connected by means of the elastic wires SW to a wire holder WH fixed on the actuator baseplate AP. Magnets M fixed to a return plate RC are provided on the actuator baseplate AP. A U-shaped return plate RC in each case engages in a space formed by a focus coil FC. On the focus coils FC, tracking coils TC are arranged in the interspace formed by a limb of the return plate RC and magnets M. The lens holder LH is constructed symmetrically and bears in its centre a lens L for focusing and for tracking the scanning beam on the optical recording medium. As illustrated in FIG. 9, in the case of the known actuator, a focus coil FC is incorporated only partly in the lens holder LH at a respective end of the lens holder LH and two focus coils FC are used for focusing. In scanning devices of this type, the coil currents are limited to on average 180 mA despite this arrangement, so that only low acceleration values in the region of from five to eight times the acceleration due to gravity are achieved. Heavy and compact scanning devices having a high natural resonant frequency can likewise only be accelerated up to the range mentioned above and articulated-arm actuators likewise have only low sensitivity on account of the frictional forces in the articulated joints.

Figure 3:
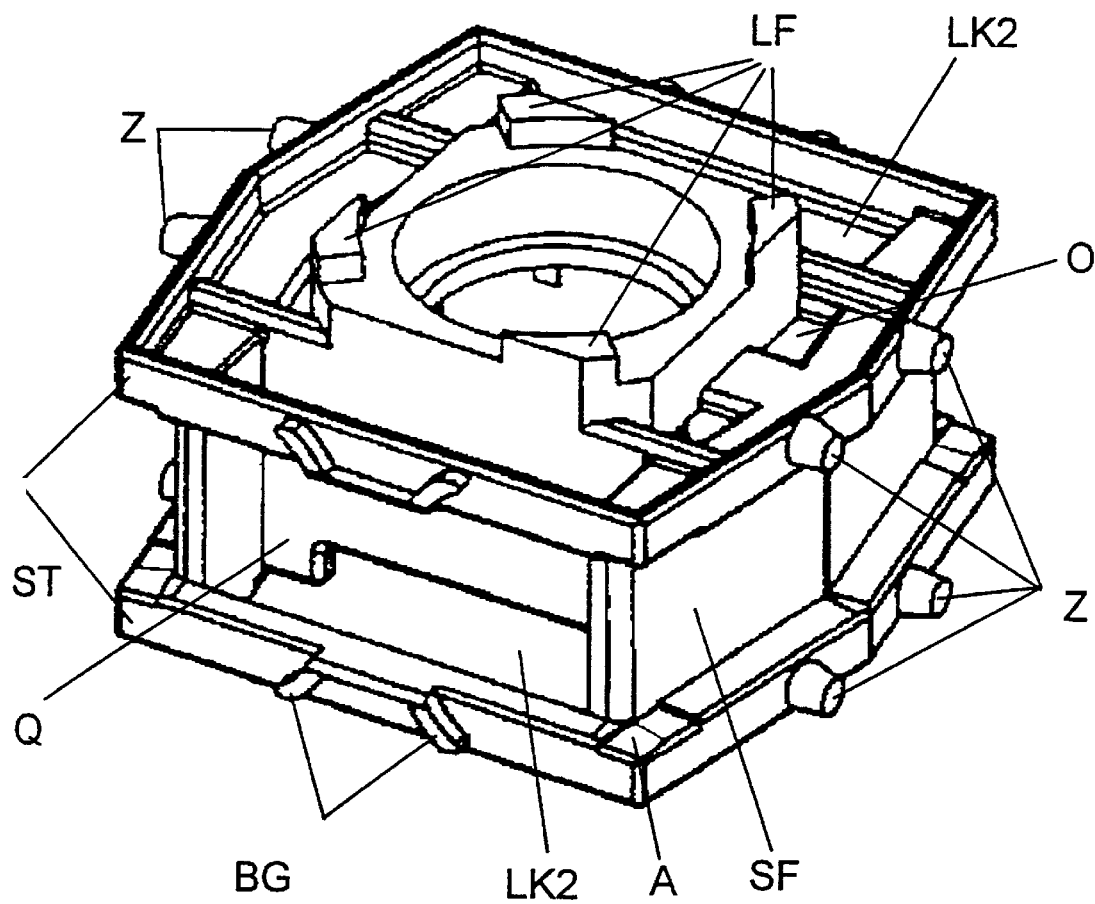
FIG. 3 shows a perspective illustration of a view of a lens holder of the optical scanning device, the said lens holder being produced from plastics material.
Figure 4:
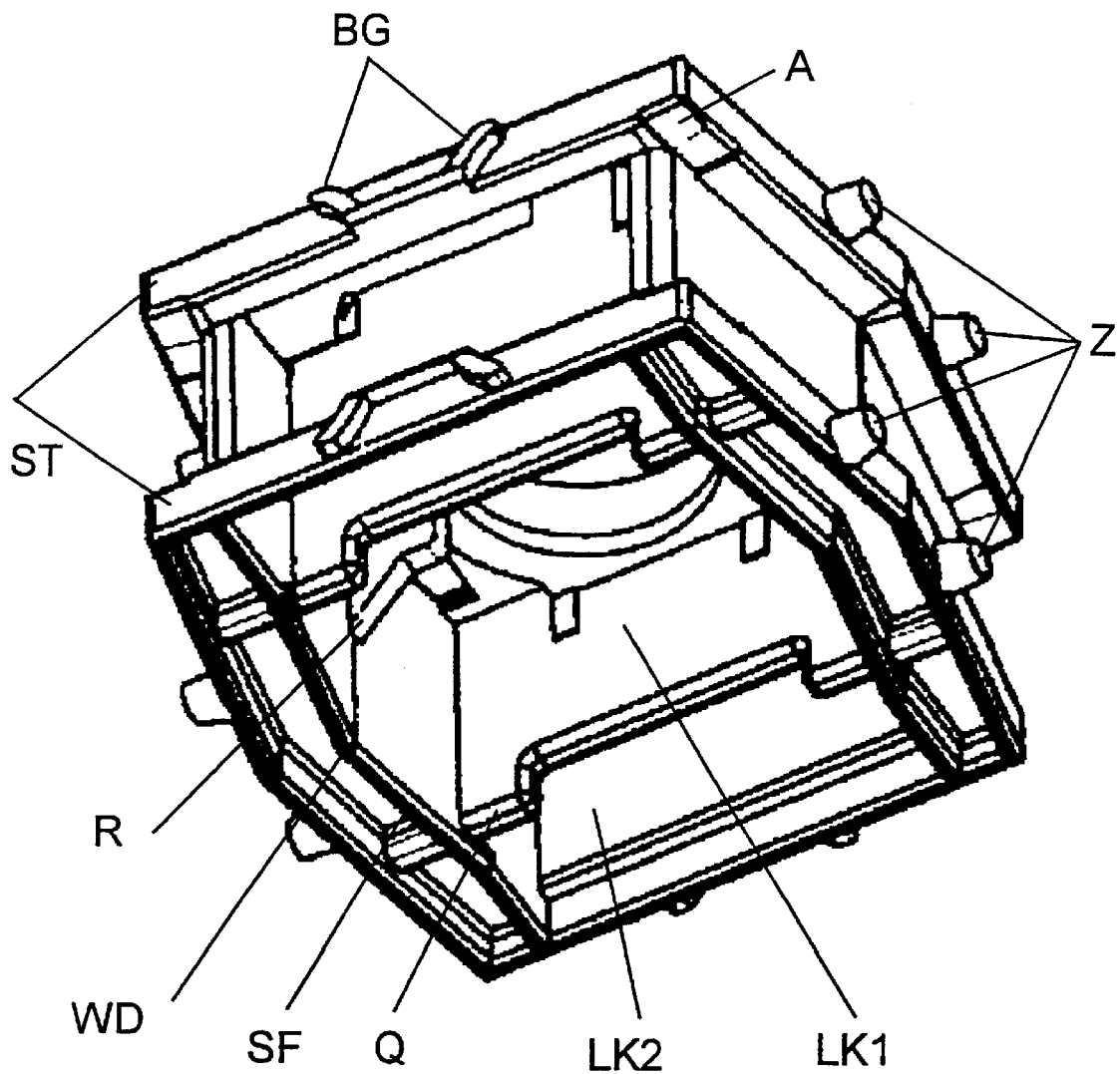
FIG. 4 shows a perspective illustration of a view from the underside of the lens holder produced from plastics material.
Figure 5:
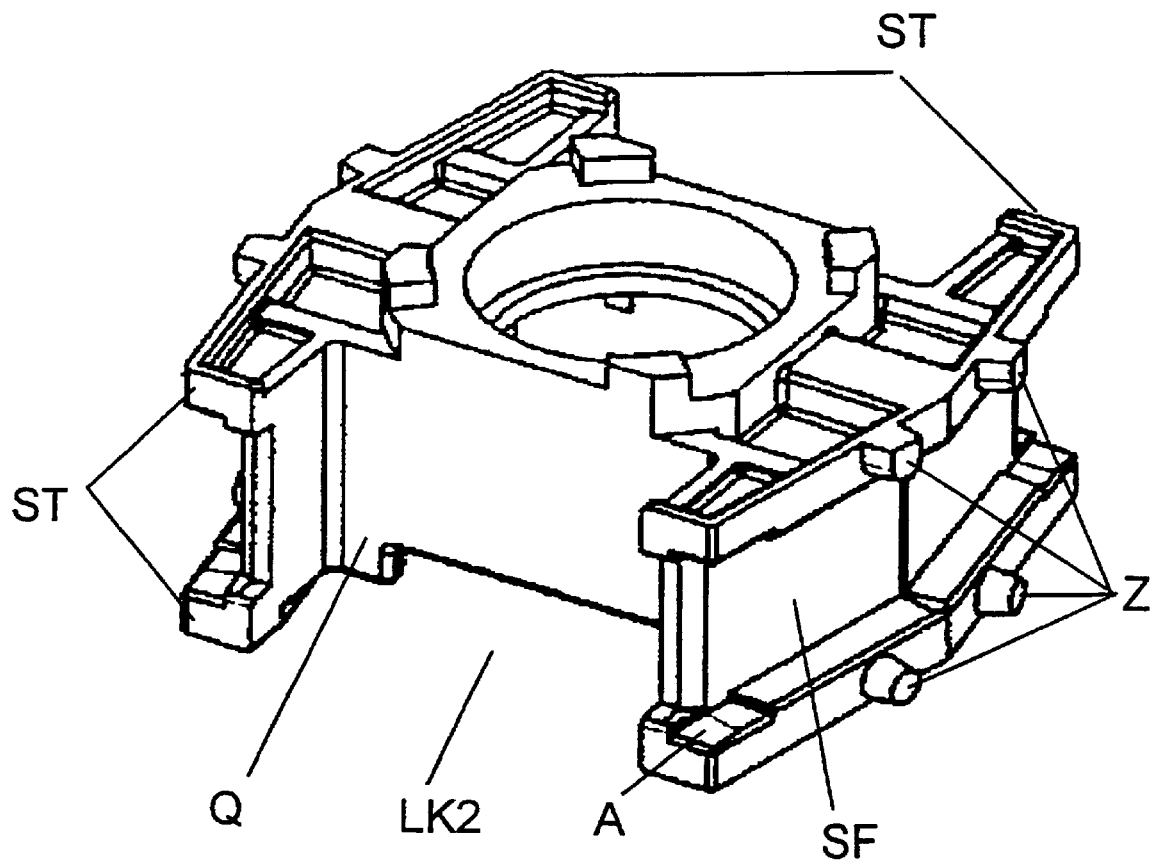
FIG. 5 shows a perspective illustration of a view of a lens holder of the optical scanning device, the said lens holder being produced from metal material.
Figure 6:
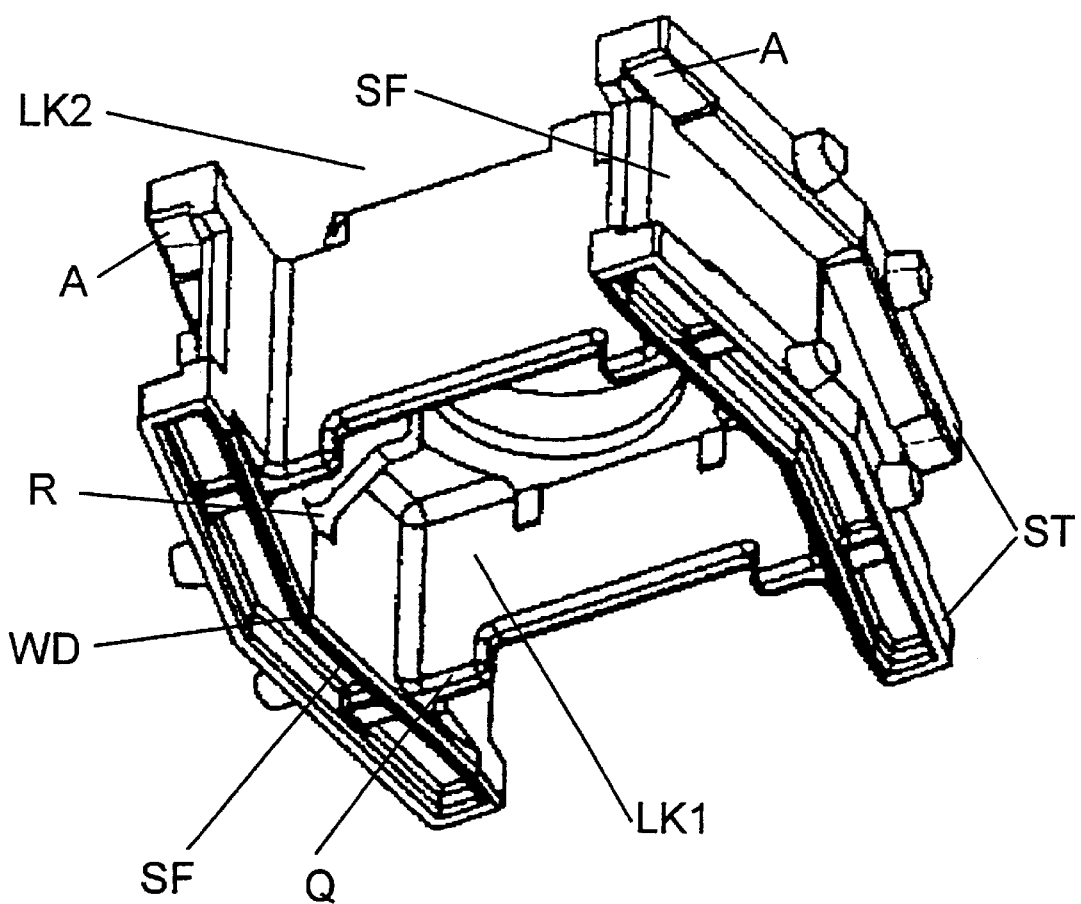
FIG. 6 shows a perspective illustration of a view from the underside of the lens holder produced from metal material.
Figure 11:
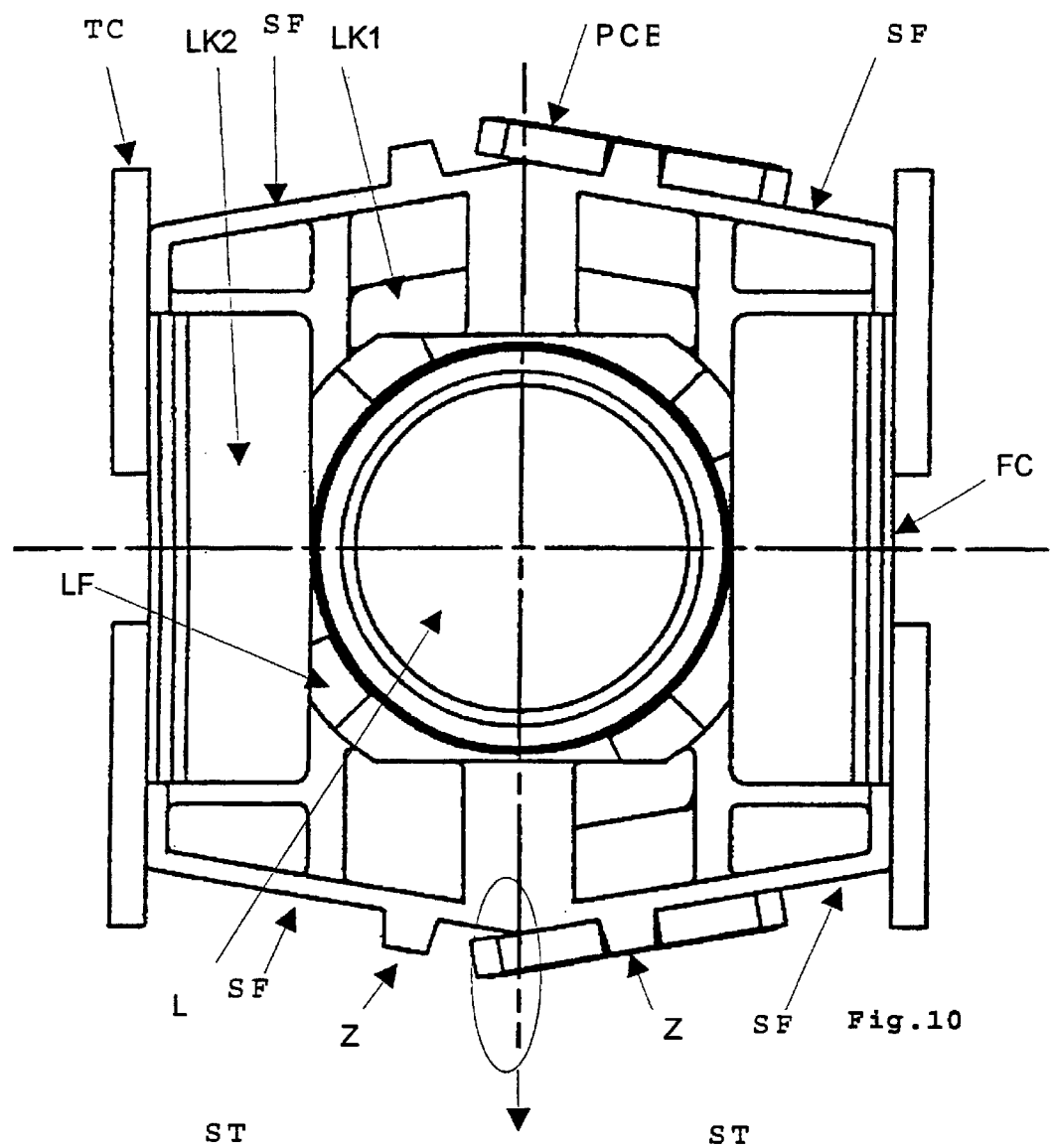
FIG. 11 shows a schematic sketch of a section through a side wall of an optical scanning device for optical recording media with a first focus winding.
Figure 12:
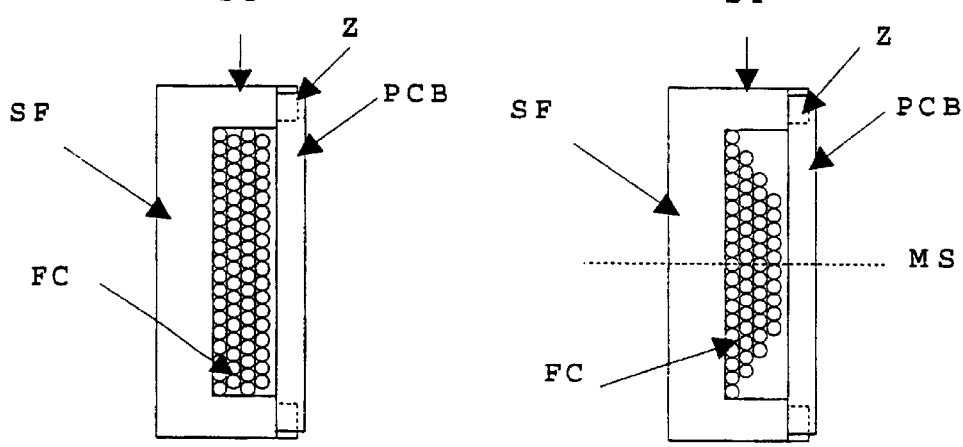
FIG. 12 shows a schematic sketch of a section through a side wall of an optical scanning device for optical recording media with a second focus winding.
Figure 13:
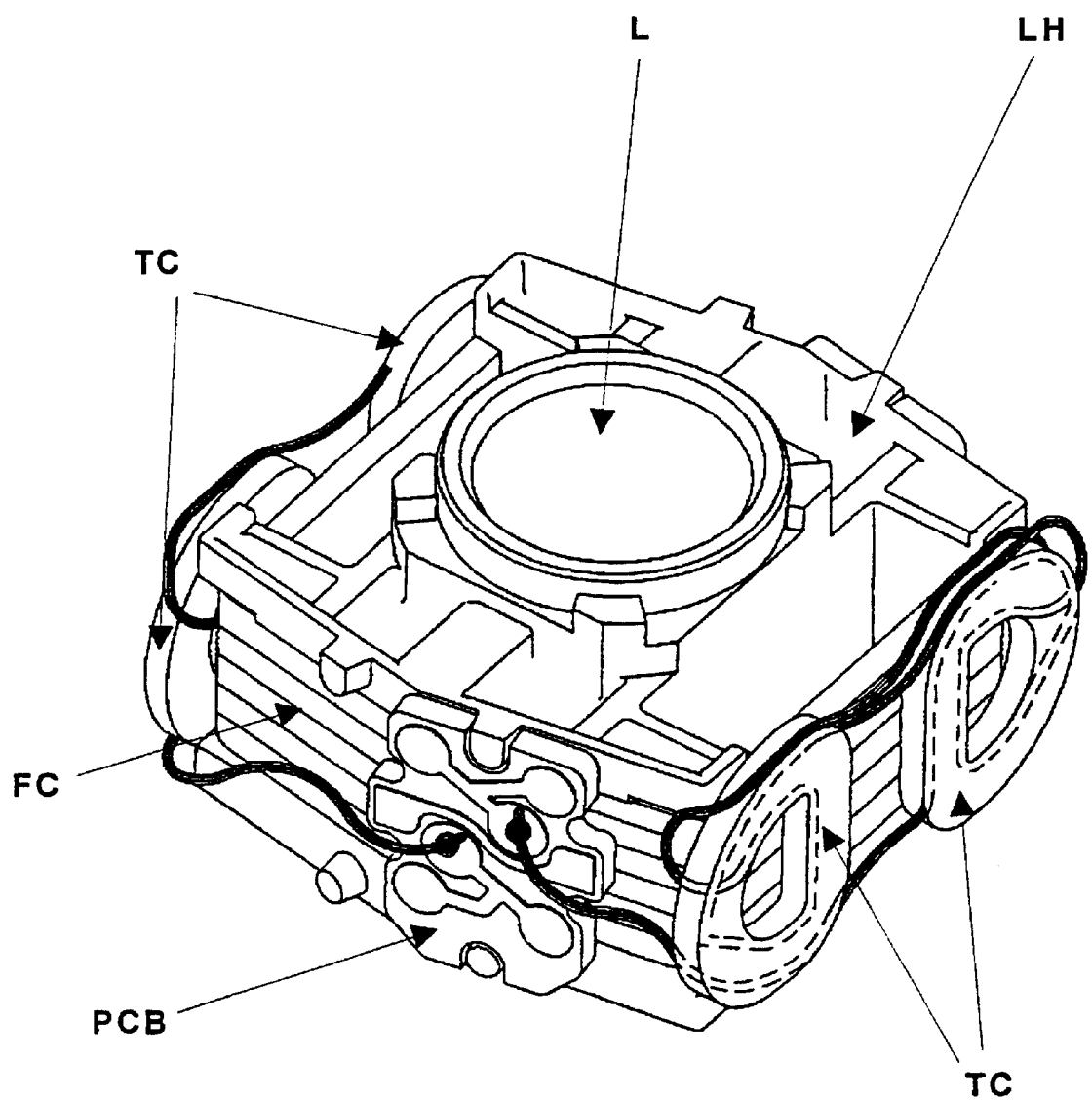
FIG. 13 shows a schematic sketch of a first side view of the actuator in a perspective illustration.
Figure 14:
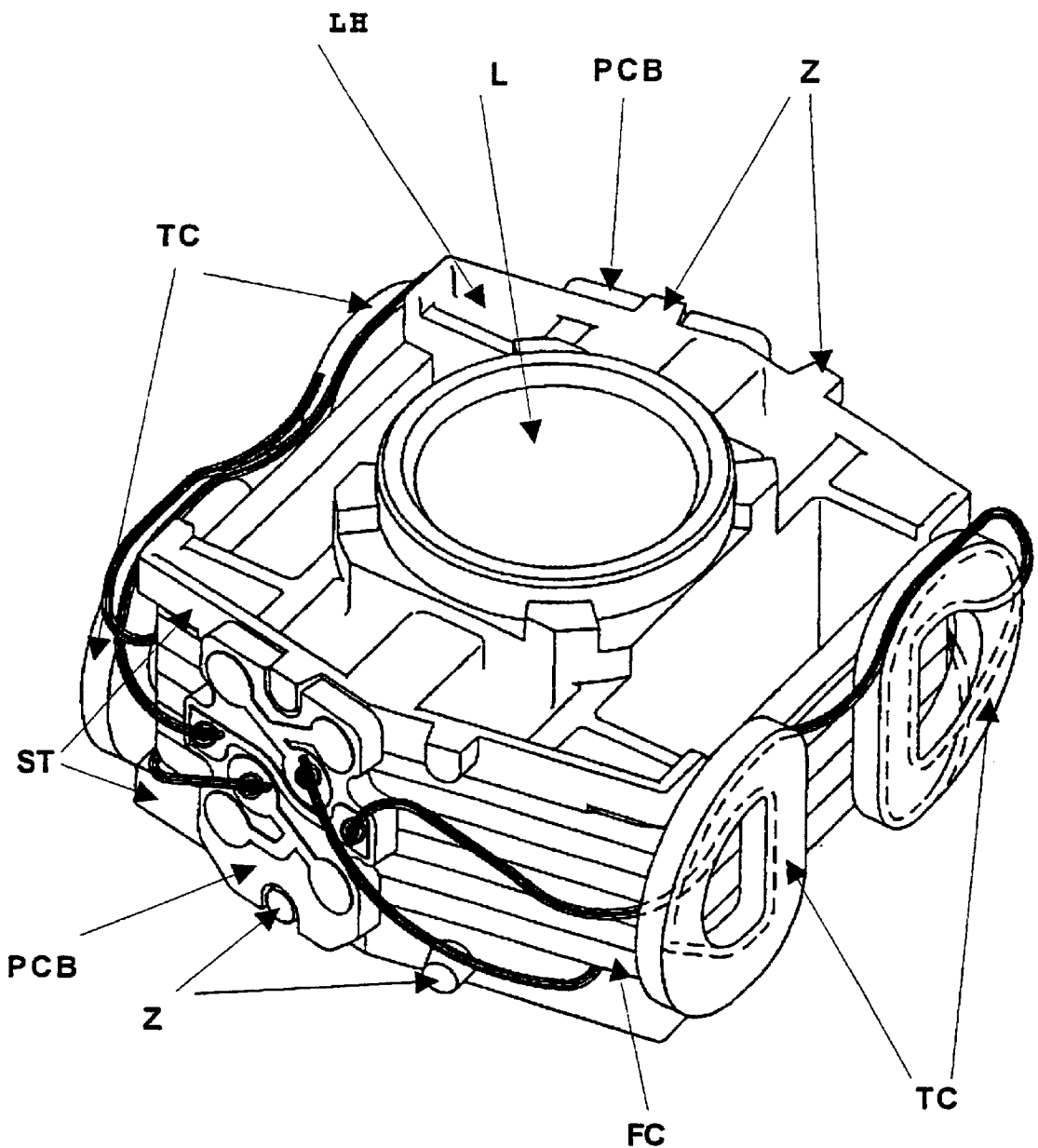
FIG. 14 shows a schematic sketch of a second side view of the actuator in a perspective illustration.

Therefore, an optical scanning device corresponding to FIGS. 1 to 6 and 10 to 14, for recording and/or reproducing information at high speed, was created which has a lens holder LH which is formed by a hollow body and whose side walls SF, as illustrated in FIGS. 1, 3–6, 10 and also 13 and 14, are arranged such that they run at an angle to a connecting point VP with its elastic support. The lens holder LH is of integral design and can be produced and mounted with a low degree of complexity. The arrangement of the focus coil FC and of the tracking coils TC at a relatively large distance from the lens L and also air chambers which are provided and separate the lens L from the coils enable the use of larger coil currents, with which higher acceleration values are attained. The air chambers are formed by the hollow body of the lens holder LH and effect additional cooling during movements performed by means of the actuator. Furthermore, in order to increase the heat dissipation, the lens holder LH is preferably designed to be black, in order to be able to permit higher coil currents. Preferably, as illustrated in FIGS. 4 and 5, the lens holder LH has a greater wall thickness WD or ribs R in the inner region, in order to achieve high stability of the lens holder LH and thereby ensure that a second resonant frequency is shifted deep into the kilohertz range above 35 kilohertz. The side walls SF of the lens holder LH have depressions in which, as illustrated in FIGS. 11 to 14, the focus coil FC is arranged and webs ST formed by the depressions in the upper and lower regions of the lens holder LH are connected to a circuit board, preferably formed by a printed circuit board PCB, in the region of connection to its elastic support. The connection of the upper and lower regions of the lens, holder LH, which connection is formed by the circuit board and forms a fixed bridge between the upper and lower regions of the lens holder LH, likewise contributes to the stability of the lens holder LH and hence to increasing the resonant frequency. In the case of the design—illustrated in FIGS. 3 and 4—of the lens holder LH with peripheral webs ST in the upper and lower regions of the lens holder LH, the rigidity of the lens holder LH is furthermore increased by the tracking coils TC being adhesively bonded to the webs ST of the lens holder LH. In order to align the tracking coils TC on the lens holder LH, projections forming delimiters BG are provided on the webs ST. speed The lens holder LH is designed as a hexagon with four side walls SF arranged at an angle of from 3 to 10 degrees, thereby increasing its rigidity and producing an additional space for air chambers. The lens holder LH is composed of plastic or metal and is preferably designed with a black surface in order to increase thermal radiation. The wires SW which elastically support the lens holder LH are arranged in the direction of the lens holder LH either at the same angle as the side walls SF of the lens holder LH or at a smaller angle, but the angle should not fall below 2 degrees, in order to reduce the sensitivity of the lens inclination. In order to reduce the weight, copper-coated aluminium wire is preferably used as the focus coil FC. The D-shaped tracking coils TC illustrated in FIGS. 13 and 14 reduce undesirable magnetic forces in unused coil regions, the resistance and hence the impedance of the coils. The printed circuit board PCB, which is likewise illustrated in FIGS. 13 and 14 and connects the upper to the lower web ST of the lens holder LH, is constructed symmetrically and is used both for the connection of the wires SW which elastically support the lens holder LH, and for the connection of the focus coil FC and tracking coils TC. The ends of the coils are connected to one another in the manner illustrated in FIGS. 13 and 14 and guided to soldering points on the printed circuit board PCB. In principle, however, connection combinations other than the ones illustrated in FIGS. 13 and 14 are also possible. Closer examination of FIGS. 13 and 14 reveals that this design is based on a lens holder which is illustrated in FIGS. 5 and 6. The difference from the lens holder LH illustrated in FIGS. 3 and 4 is that it has no peripheral web ST. A peripheral web ST has been dispensed with in this design for reasons of producing the lens holder LH from metal, in order to reduce the problems arising in a metal injection-moulding method on production of the narrow webs ST on the front and rear sides of the lens holder LH. The tracking coils TC are fixed on the focus coil FC in the known manner in the case of this design. The schematic sketch—illustrated in FIG. 1—of a plan view of an optical scanning device for scanning optical recording media at high speed shows the hexagonal lens holder LH with an H-shaped structure. The hexagonal form is formed by side walls SF arranged at an angle to one another and side wall sections which are arranged such that they run towards one another at an angle. The front and rear sides of the lens holder LH are provided such that they run parallel to one another. By virtue of the hexagonal form of the lens holder LH, the distance between a lens L arranged in the centre of the lens holder and the side walls SF which accommodate a focus coil FC is enlarged and, in accordance with one design, openings O are provided which reduce the air resistance of the actuator in the focus direction and contribute to intensified cooling of the actuator. The larger distance between focus coil FC and lens L and also, if appropriate, openings O provided in the region of the lens L enable the optical scanning device to be operated with increased coil currents, thereby increasing the speed of the actuator movement and reducing the thermal loading on the lens L. Furthermore, the side walls SF arranged at an angle to one another reduce the air resistance during lateral movement of the actuator. An air stream which is increased relative to a straight side wall increases the heat dissipation. The focus coil FC follows the hexagonal contour of the lens holder LH, does not project beyond the lens holder LH in comparison with known arrangements and is at a greater distance from the lens L. The focus coil FC and tracking coils TC arranged on the focus coil FC interact with magnets M for the deflection or for the movement of the actuator, which magnets, in accordance with FIG. 2, are fixed on the inside of a limb of a U-shaped return plate RC arranged on the actuator baseplate AP. The other limb of the U-shaped return plate RC is arranged in such a way that it dips into the focus coil FC with sufficient clearance for the movement of the actuator. Each of the magnets is a magnet with a magnetic south pole S and a magnetic north pole N. As illustrated in FIGS. 1 and 2 and also 10, 13 and 14, circuit boards are arranged laterally on the lens holder LH, which circuit boards are formed by printed circuit boards PCB and, in accordance with FIG. 1, have a connecting point VP with a wire SW which elastically supports the lens holder LH and is held by a wire holder WH on the actuator baseplate AP. The wires SW which elastically support the lens holder LH are arranged in the direction of the lens holder LH at an angle which is less than the angle at which the side walls SF of the lens holder LH are provided on a side in a manner deviating from a straight line. The lens holder LH is constructed symmetrically and the side walls SF are arranged such that they run at an angle in the range of from 3 to 10 degrees to the abovementioned connecting point VP with its elastic support. In accordance with this principle, the lens holder LH is formed by a hollow body made of plastic or metal illustrated in FIGS. 3 to 6. The structure illustrated in FIGS. 3 and 4 is preferably used for producing the lens holder LH from plastic and the structure illustrated in FIGS. 5 and 6 is preferably used for producing the lens holder LH from metal or using a metal injection-moulding method. The lens holder LH illustrated in FIGS. 3 and 4 is hexagonal and has peripheral webs ST with pins Z and delimiters BG. The pins Z on the upper and lower webs ST are provided for aligning the circuit board that is to be mounted after the application of the focus coil FC. Since, on each side of the lens holder LH, as illustrated in FIGS. 10, 13 and 14, in each case only one pin Z on the upper web ST and one pin Z on the lower web ST are required for aligning the circuit board, the respective other pin Z on the upper and lower webs ST can be used for attaching winding wires during the manufacturing process. Delimiters BG provided as elevation on the webs ST in the centre on the front and rear sides are provided for aligning the tracking coils TC during the mounting process. This means that complicated mounting devices are not required. The tracking coils TC are fixed by adhesive bonding on the focus coil FC.

The lens holder LH is a hollow body which forms a first air chamber LK1 by virtue of the distance between the side walls SF and transverse walls Q and the lens L and forms a respective second air chamber LK2 with the distance between the areas of the transverse walls Q and the focus coil FC on the front and rear sides of the lens holder. The air chambers LK1 and LK2 isolate the lens L from the coils of the actuator and thereby enable the use of higher coil currents, as are required in optical scanning devices for recording or reproducing information on optical recording media at high speed. Furthermore, as illustrated in FIGS. 1 and 3, openings C are provided in the region surrounding the lens L, which openings reduce the air resistance of the lens holder LH during movements in the focus direction and increase the heat dissipation.

Guide webs LF are provided in order to facilitate the mounting of the lens L on the lens holder LH, and ribs R and also thickened wall portions WD are provided in order to increase the rigidity of the lens holder LH.

The side walls SF of the lens holder LH are connected via transverse walls Q, which preferably have a cutout in order to prevent rotation of the lens holder LH in the mounting device. The transverse walls Q contribute to the stiffening of the lens holder LH and a reduction in the weight of the lens holder LH is achieved by virtue of the cutouts in the transverse walls Q. The depth of the cutouts is chosen in such a way that the centre of gravity of the lens holder LH lies exactly between the wires SW which elastically support the lens holder LH. FIGS. 5 and 6 show the lens holder LH produced from metal. In this design, the hexagonal lens holder LH has an H-shaped structure formed by the side walls SF which are arranged at an angle to one another or side wall sections which are arranged such that they run towards one another at an angle. In this design, too, the hexagonal form of the lens holder LH enlarges the distance between the coils of the actuator and a lens L arranged in the centre of the lens holder LH. Webs ST provided for holding the coils and for fixing the circuit board on pins Z have been arranged exclusively on the side areas SF of the lens holder in order to simplify the production of the lens holder LH from metal. Even though the side walls SF are not connected via webs ST on the front and rear sides of the lens holder LH, the lens holder LH has sufficient stability on account of its production from metal. With the side walls SF the transverse walls Q form a first air chamber LK1, which isolates the focus coil FC with respect to the lens L. A second air chamber LK2, which is initially open on account of the H-shaped structure of the lens holder LH, is formed by the transverse walls Q with the focus coil FC to be applied to the lens holder LH. As a result, the basic concept of the lens holder LH in this design corresponds to that of the lens holder LH illustrated in FIGS. 3 and 4. On account of the design of the lens holder LH from metal, additional openings O, provided in the region of the lens L in accordance with the design illustrated in FIGS. 3 and 4, can be omitted in this design since the metallic body, preferably having a black surface, already ensures sufficient heat dissipation. Dispensing with the openings O simplifies the production of the metallic lens holder LH.

FIGS. 7 to 9 illustrate, for comparison purposes, a known optical scanning device, which does not have the advantages of the optical scanning device according to the invention since it exhibits a comparatively larger air resistance even during lateral movement, less heat dissipation, greater thermal loading on the lens L as a result of a comparatively shorter distance from the coils that are heated in high-speed applications, and also greater tilting of the lens L in the event of lateral deflection for tracking on account of wires SW arranged parallel as elastic support for the lens holder LH.

FIG. 10 shows, in a schematic sketch, the plan view of the actuator of an optical scanning device according to the invention for recording and/or reproducing information at high speed. The actuator is formed by a hexagonal lens holder LH having side areas SF arranged at an angle to one another. With the hexagonal form of the lens holder LH, a first air chamber LK1 and a second air chamber LK2 are formed, which advantageously isolate the lens L arranged in the centre of the actuator from the focus coil FC and the tracking coils TC. For the positioning of the lens L, guide webs LF are provided on the lens holder LH. The side walls SF have webs ST which, as illustrated in FIGS. 11 and 12, bound the winding space of the focus coil FC and bear pins Z accommodated by a circuit board designed as a printed circuit board PCB. The printed circuit board PCB advantageously connects the upper and lower webs ST on the side wall SF of the lens holder LH and in this region closes the winding space of the focus coil FC. The focus coil FC is preferably arranged symmetrically with respect to a horizontal centre MS of mass of the lens holder LH and is designed as a rectangular coil body in accordance with FIG. 11, or as a trapezoidal coil body in accordance with FIG. 12.

FIGS. 13 and 14 show the actuator in a perspective illustration from the rear and front sides.

Two D-shaped tracking coils TC are arranged in each case on the front and rear sides of the actuator. Both the two tracking coils TC arranged on the front side and the two arranged on the rear side are each connected to one another, so that two winding ends are formed in each case by a coil pair. As becomes clear in particular from FIG. 13, one winding end of a coil pair is guided to a connection point on a printed circuit board PCB arranged on one side of the actuator, while the other winding end of the coil pair is guided to the printed circuit board PCB arranged on the opposite side of the actuator. On the side illustrated in FIG. 13, the connection points for a respective winding end of a coil pair on the front and rear sides of the actuator are isolated from one another and connected via conductor tracks to connection points for the wires which support the actuator elastically and for power supply purposes. On the side which is opposite to this side, and is illustrated in FIG. 14, the winding ends are connected to one another via a conductor track on the printed circuit board PCB and the ends of the focus coil FC are connected to the connection points corresponding to the other side. As a result, a symmetrically constructed printed circuit board PCB can advantageously be used which is independent both of the side on which it is to be mounted and of the direction of rotation in which it is to be mounted. The printed circuit board PCB, as illustrated in FIGS. 13 and 14, has in each of the corners a connection point which is connected, via conductor tracks, to a connection point arranged at the same level and to a further connection point that is likewise provided in that half of the printed circuit board. The two halves of the printed circuit board PCB are separated by a further conductor track having a connection point at each of its ends. This produces a symmetrically constructed printed circuit board PCB with conductor tracks having a respective connection point at the ends, which is formed approximately in the form of two oppositely situated Y's separated by a straight line or S-shaped conductor track. The winding direction of the coils results from the direction—intended with the current direction—of the deflection of the actuator from its neutral position. By means of the tracking coils TC wound in a D-shaped manner, portions of the coils which do not contribute to force generation are reduced and, as a result, the efficiency is improved. Leakage fields which are generated by rectangular tracking coils TC, counteract the force generated in the inner region and thereby lead to losses are reduced. The focus coil FC which wraps around the lens holder LH is wound in depressions formed with the webs ST in the side walls SF. The coil wire used is preferably copper-sheathed aluminium wire since aluminium-core wire is lighter than comparable solid-copper wire and thus, with a lower weight, larger forces or higher acceleration values are achieved for scanning optical recording media at high speed.

In order to prevent turns from crossing one another during the application of the focus coil FC, shoulders A are provided on the inner faces of the webs ST, as illustrated in FIGS. 3 to 5. The optical scanning device constructed with an actuator in accordance with FIG. 1 and FIG. 2 has a frequency response FG and phase profile PG illustrated in FIG. 15. The frequency response FG and phase profile PG, which are illustrated in a logarithmic representation in the frequency range of from 5 hertz to 50 kilohertz, are comparatively regular, the gain decreasing as the frequency increases in a known manner. It is noticeable that a resonant frequency RE in the frequency response FG was detected only in the region near 50 kilohertz and the level reduction or attenuation at this resonant frequency RE has a distance D of 45 decibels from the gain at a frequency of 1 kilohertz. With such a frequency response FG and phase profile PG, the optical scanning device is particularly suitable for scanning optical recording media at high speed.

What is claimed is:

1. Optical scanning device having a lens holder which is elastically supported by means of wires, for recording and/or reproducing information at high speed, said lens holder being formed of a hollow body in which side walls have a depression for accommodating a focus coil and webs formed by the depression and whose side walls are arranged such that they run at an angle to the wires when the lens holder is in the neutral position, wherein the optical scanning device has a lens holder which is formed by a hollow body having side walls forming a depression for accommodating a focus coil and forming webs formed by the depression and which are connected via a circuit board having connection points for the elastic support and coils arranged on the lens holder.

2. Optical scanning device according to claim 1, wherein the circuit board is a printed circuit board having soldering points and having a symmetrically arranged conductor structure.

3. Optical scanning device according to claim 2, wherein the printed circuit board is a printed circuit board having a conductor structure formed by conductor tracks which have at the ends a respective connection point and a form of two oppositely situated Y's separated by a straight line or S-shaped conductor track.

4. Optical scanning device according to claim 1, wherein the side walls of the lens holder have a depression for accommodating a focus coil and webs formed by the depression have pins for aligning a circuit board which connects the webs.

5. Optical scanning device according to claim 1, wherein the lens holder is a lens holder produced integrally from plastics material and having circumferential webs in the upper and lower regions of the lens holder increasing the rigidity of the lens holder and having projections forming delimiters provided on the webs in order to align tracking coils on the lens holder being adhesively bonded to the webs.

* * * * *